Feb. 13, 1968 H. LUDEWIG 3,368,874
APPARATUS FOR THE CONTINUOUS POLYMERIZATION
OF MONOMERIC SYNTHETICS
Filed Sept. 25, 1964
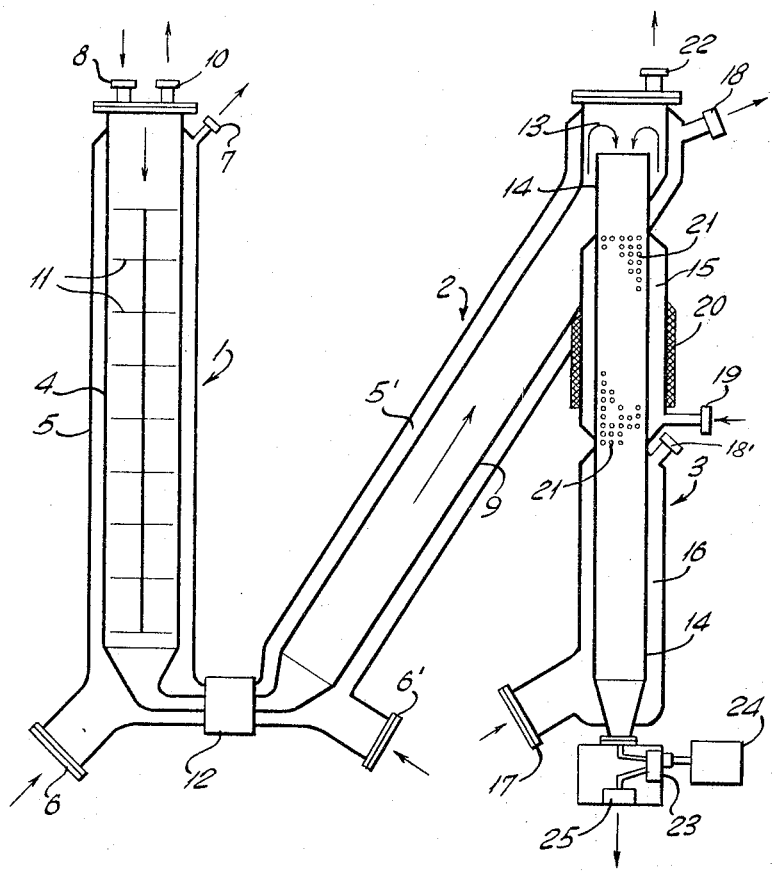
INVENTOR
HERMANN LUDEWIG 3,368,874
APPARATUS FOR THE CONTINUOUS POLYMERIZATION OF MONOMERIC SYNTHETICS
Hermann Ludewig, Rudolstadt, Germany, assignor to Veb Chemiefaserwerk Schwarza "Wilhelm Pieck," Rudolstadt, Germany
Filed Sept. 25, 1964, Ser. No. 399,215
3 Claims. (Cl. 23—283)

ABSTRACT OF THE DISCLOSURE

The present invention relates to a device for the continuous polymerization of molten monomeric synthetic polyamide-forming substances, more particularly $\epsilon$-caprolactam, said device comprising a vertical down-tube, adjacent thereto an inclined riser tube, and then a second vertical down-tube so arranged that the head portion of the riser tube encloses the top portion of the second down-tube so that the melt is permitted to overflow from the riser into the second down-tube, where it passes down along the inner wall; in a preferred embodiment the overflowing film of the melt in said second down-tube is traversed in its upper portion by superheated steam for the removal of monomers.

---

There are, at the moment, several devices known for the continuous polymerization (VK-polymerization) is the form of systems of tubes, such as U-tubes, N-tubes, Z-tubes. The latter device, more particularly, comprises a system of tubes which consists of a substantially vertical tube, connected to two adjacent, likewise vertical, concentrically arranged tubes the arrangement being so designed that the melt mounts in the external one of the two tubes, passes over into the internal tube, and flows downward in the latter.

The tubular systems so far used, particularly the Z-shaped tubes, have considerable disadvantages, especially when the through-flow is high.

The concentric tubes do not permit an even passage of the melt through the external riser tube. The time of passage fluctuates considerably depending on the fact whether the melt in the riser tube is nearer the side facing the down-tube, or facing away therefrom. The melt becomes consequently inhomogeneous.

Furthermore, the temperature of the melt in the second down-tube which is located in the riser tube, is dependent on the temperature of said riser tube and cannot be controlled independently. It is another drawback that concentric tubes cannot be fully utilized as is the case with tubes of the same diameter and length when placed side by side.

The N-shaped tube, while not having the disadvantages mentioned above, does not provide the possibility to direct the melt, when combined with the Z-tube, into a tube in such a manner that it will be surrounded from all sides by the riser tube and be passed over the upper rim of the down-tube and into the latter so that the entire inner wall of the second down-tube will be covered with melt continuously.

It is the object of the present invention to provide a process and an apparatus for the continuous polymerization of polyamide forming monomers which is free of the disadvantages of known processes and devices and which makes it possible to carry out such polymerization in a simple and inexpensive manner.

Other objects and advantages will become apparent from the following detailed description.

It has now been discovered that it is possible to combine the advantages of the Z-tube system with those of the N-tube system by making the following adjustments: The apparatus according to the invention provides a vertical down-tube, adjacent thereto an inclined riser tube, and then a second vertical down-tube, in such a manner that the second down-tube is surrounded in its top part by the head portion of the riser tube in a similar manner as hitherto known for the Z-tube, that is to say that the melt is permitted to overflow from the riser tube into the second down-tube.

In a preferred embodiment of the invention, the second down-tube may be shortened, and it may then be used for the so-called monomer-eliminating vapor process in which the overflowing film of the melt which slides down the walls of the second down-tube, is traversed by super-heated steam for removal of monomers, said steam serving at the same time as a protective gas against oxidation. For that purpose, the second down-tube which projects downwardly from the head portion of the riser tube, is surrounded by a steam jacket and at the separating wall between down-tube and jacket, holes are provided for the passage of steam. Consequently, steam is admitted to the second down-tube through the holes in the wall, passes through the film of the melt, flowing in downward direction, and is then withdrawn and condensed in a known manner.

When the second down-tube is so designed that the zone under the impact of steam is prolonged into the lower portion heated with diphenyl, there will be a vertical supor-position of two heating jackets provided that the heating is not done in a different manner, for instance by induction or resistance heating.

The main advantage of the device according to the invention as compared to a Z-tube consists therein that, in spite of the possibility of overflow for the melt, there will only be a very narrow zone of a nested tubular system and the melt will be capable of rising without obstacle in the entire system.

In the sole figure of the accompanying drawing, an embodiment of a device according to the invention is illustrated by way of example.

The drawing shows a down-tube generally designated by 1, a second down-tube generally designated by 3, and arranged therebetween an inclined riser tube, generally designated by 2. The down-tube 1 comprises an inner tube 4 and a heating jacket 5 having an inlet or heating tube 6 and an outlet or vent tube 7 for admission or heating by electric means and withdrawal or ventilating respectively of a heating agent, e.g. Dinyl, which is a mixture of diphenyl and diphenyl ether.

The inner tube 4 has at the top a feed-in tube 8 through which the polyamide-forming substance together with admixtures enters the inner tube; a second tube 10 serves for the escape of steam formed during the polymerization occuring in tube 4. The last mentioned tube is provided with plate-shaped inserts 11 arranged around a vertical tube and installed within the tube over a substantial part of its length, in order to direct the passage of the melt therethrough, and which insure in that manner a thorough homogenization of the melt owing to its forced passage.

The riser tube 2 comprises an inner tube 9 and a heating jacket 5' the inlet or heating tube of which for a heating liquid is designated by 6' and the outlet or vent tube is designated by 18. Between down-tube 1 and riser tube 2, a pump 12 is arranged which delivers the melt into the riser tube and which also serves for controlling the level of the melt in tube 3.

Pump 12 may be replaced by other means (not shown) for regulating the respective melt levels within tubes 1 and 2 as well as within down-tube 3.

At the top, tube 9 has a vertical section or head portion 13 which is arranged to partly surround the top end of an inner tube 14, which forms part of down-tube 3.

Tube 14 is provided with two jackets, 15 and 16, respectively. Jacket 16 serves for heating the lower portion of tube 14, the heating agent being again Dinyl vapor or the like. Tube 17 serves for admitting or heating the agent. At 18', the corresponding outlet or vent tube is shown.

Through the upper jacket 15, steam is admitted through a tube 19; an electric heating coil 20 is provided for superheating the steam to the desired temperature. The upper portion of tube 14 in the region where it is surrounded by jacket 15, is provided with perforations 21 so that steam from said jacket can enter and pass through the melt contained in tube 14. A tube 22 at the top of the head portion 13 of tube 9 is provided for the withdrawal of the combined vapors, i.e. vapors escaping from the melt together with steam passed therethrough.

At the bottom, a pump 23 is arranged, operated by a motor 24, for delivery of the melt from tube 14, through a nozzle schematically indicated at 25, for further processing.

The operation of the device will now be explained in a specific example.

EXAMPLE

Into the inner tube 4 having a capacity of 1000 liters, a melt of a polyamide-forming substance, preferably $\epsilon$-caprolactam together with admixtures, is fed at the rate of 80 kg. per hour. The temperature inside the tube is maintained at about 260° C. The pressure is normal atmospheric pressure. Under these conditions, the time of stay in tube 4 will be 12 hours and polymerization of the monomeric melt proceeds smoothly.

As set forth above, the melt is continuously delivered by pump 12 from tube 4 through the riser tube 9 to the second down-tube 14, where the polymerization is carried to completion. During the upward travel through tube 9, the melt is maintained at a temperature of 260° C. too.

Due to the novel construction of the apparatus, the melt enters down-tube 14 by spilling over the top evenly from all sides, and travels down said tube along the walls in a comparatively thin film; it is controlled in its downward flow by pump 12, which is so adjusted with respect to the capacity of tube 14 that the melt is allowed to remain in the tube for from 30 to 60 minutes.

In the upper portion of tube 14, where perforations 21 are provided, steam having a temperature of 250° C., is made to pass through the melt whereby most of the monomeric components still contained therein are removed together with the escaping steam through tube 22. The monomeric portion can be collected and re-introduced for further processing; the polymer melt relieved from any residual monomer leaves the apparatus at 25 for further processing.

Yields: From an amount of 1000 kg. of polyamide-forming substance, e.g. $\epsilon$-caprolactam, 950 kg. of polymer are obtained, i.e. an output of 95%.

While I have described a preferred embodiment of the apparatus according to the invention and an example for the operation of the same, it should be understood that these are given by way of illustration and not of limitation and that many modifications in the details can be made without departing from the spirit of the invention.

What I claim is:

1. An apparatus for the continuous polymerization of monomeric synthetic polyamide-forming compounds which comprises in combination a first substantially vertical down-tube, and a second substantially vertical down-tube for the travel of a melt of said compound to be polymerized from top to bottom, an inclined riser tube arranged between said first and second down-tubes for the connection thereof, feed-in means at the top of said first tube for admission of said compound to be polymerized, pump means between the bottom of said first down-tube and said riser tube for delivering melt into the same, a head portion on said riser tube positioned to enclose the top portion of said second down-tube in spaced relationship thereto to permit even flow of the melt from said riser tube into said second down-tube for passage along the inner wall of said second down-tube, and withdrawal means for discharge of said melt from said second down-tube.

2. The apparatus according to claim 1 which further comprises independent heating means each for said first down tube, said riser tube, and said second down tube for separate temperature control in each of said tubes.

3. The apparatus according to claim 2, wherein the heating means for said second down tube comprises two separate superposed heating jackets, means on said upper heating jacket for superheating and means for the admission of steam to said apparatus and a perforated upper portion in said second down tube through which the superheated steam is introduced, and means at the top of said second down-tube for withdrawing said steam together with remaining monomeric components from the melt.

References Cited
UNITED STATES PATENTS

| | | | |
|---|---|---|---|
| 2,776,284 | 1/1957 | Hood | 23—260 XR |
| 3,044,993 | 7/1962 | Tiemersma | 23—283 XR |

JAMES H. TAYMAN, JR., *Primary Examiner.*